(12) United States Patent
Overby, Jr. et al.

(10) Patent No.: US 10,038,721 B2
(45) Date of Patent: *Jul. 31, 2018

(54) ENABLING AN ON-PREMISES RESOURCE TO BE EXPOSED TO A PUBLIC CLOUD APPLICATION SECURELY AND SEAMLESSLY

(71) Applicant: International Business Machines Corporation, Armonk, NY (US)

(72) Inventors: Linwood Hugh Overby, Jr., Raleigh, NC (US); Anthony Ffrench, Medford, MA (US); Barry Mosakowski, Raleigh, NC (US); Adolfo Francisco Rodriguez, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 267 days.

This patent is subject to a terminal disclaimer.

(21) Appl. No.: 14/623,075

(22) Filed: Feb. 16, 2015

(65) Prior Publication Data
US 2016/0241633 A1 Aug. 18, 2016

(51) Int. Cl.
*G06F 15/16* (2006.01)
*H04L 29/06* (2006.01)
(Continued)

(52) U.S. Cl.
CPC ............... *H04L 63/20* (2013.01); *G06F 9/50* (2013.01); *H04L 63/0227* (2013.01);
(Continued)

(58) Field of Classification Search
None
See application file for complete search history.

(56) References Cited

U.S. PATENT DOCUMENTS

| 9,037,735 B1* | 5/2015 | Fallows | H04L 67/42 709/228 |
| 2014/0230076 A1 | 8/2014 | Micucci | |

(Continued)

FOREIGN PATENT DOCUMENTS

| WO | 2012115896 A2 | 8/2012 |
| WO | 2013126570 A1 | 8/2013 |

OTHER PUBLICATIONS

Fette et al., RFC 6455, "The WebSocket Protocol," 2011.*

(Continued)

*Primary Examiner* — Mohamed Ibrahim
(74) *Attorney, Agent, or Firm* — Michael P. O'Keefe; Jeffrey S. LaBaw; David H. Judson

(57) ABSTRACT

An application deployed in a public cloud is enabled to access an on-premises resource securely and without requiring additional ports on a firewall. A pair of security gateways is instantiated, one at the cloud, and another located on-premises. Each gateway can access information that is necessary to locate and establish a secure connection to the on-premises resource. In response to a determination that the application needs to access the on-premises resource, the data set is used to locate the resource. A communication request is then issued from the cloud gateway to the on-premises gateway over a socket-based communication channel established between the gateways. The communication request is sent over an HTTP-based protocol such that the application is able to access the on-premises resource without requiring an additional IP address/port to be defined at the firewall. Proxied connectivity is then enabled from the application to the on-premises resource.

10 Claims, 5 Drawing Sheets

(51) Int. Cl.
*H04L 29/08* (2006.01)
*G06F 9/50* (2006.01)
(52) U.S. Cl.
CPC ...... *H04L 63/0236* (2013.01); *H04L 63/0272* (2013.01); *H04L 63/0281* (2013.01); *H04L 63/10* (2013.01); *H04L 63/101* (2013.01); *H04L 63/168* (2013.01); *H04L 65/102* (2013.01); *H04L 67/02* (2013.01); *H04L 67/10* (2013.01); *H04L 67/28* (2013.01)

(56) References Cited

U.S. PATENT DOCUMENTS

| | | | | |
|---|---|---|---|---|
| 2014/0237585 | A1* | 8/2014 | Khan | H04L 63/16 726/15 |
| 2015/0163179 | A1* | 6/2015 | Maes | G06F 9/546 709/206 |
| 2015/0326672 | A1* | 11/2015 | Chandwani | H04L 63/0281 709/227 |
| 2015/0341456 | A1* | 11/2015 | Chiu | H04L 67/26 709/219 |
| 2016/0028780 | A1* | 1/2016 | Verzano | H04W 4/005 709/204 |
| 2016/0241614 | A1* | 8/2016 | Kang | H04N 21/41407 |

OTHER PUBLICATIONS

"How to connect to a remote database (outside Bluemix) via JNDI using a custom server.xml", developer.ibm.com, Nov. 12, 2014.
McCune, Rory, "Websocket implication for firewalls", StackExchange, Feb. 22, 2013.
European Search Report, EP Application No. 16152768.4-1853, dated Jun. 16, 2016.
Falk et al, "Accelerate Development of New Enterprise Solutions for the Cloud with Codename BlueMix," IBM Redbooks, 2014.
Fette, et al, "The WebSocket Protocol," Internet Request for Comment 6455, Dec. 2011.
European Patent Office Communication pursuant to Article 94(3), dated Mar. 5, 2018.

* cited by examiner

ENABLING AN ON-PREMISES RESOURCE TO BE EXPOSED TO A PUBLIC CLOUD APPLICATION SECURELY AND SEAMLESSLY

BACKGROUND OF THE INVENTION

Technical Field

This disclosure relates generally to deploying applications in a "cloud" compute environment.

Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate system of engagement to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

It is known in the art to provide appliance-based or platform-based solutions to facilitate rapid adoption and deployment of cloud-based offerings. Typically, a cloud-based offering is deployed as a cloud application package. One such appliance that may be used for this purpose is IBM® Workload Deployer, which is based on the IBM DataPower® 7199/9005 product family. Typically, the appliance is positioned directly between the business workloads that many organizations use and the underlying cloud infrastructure and platform components. Alternatively, cloud application packages may be deployed using platform-as-a-service (PaaS) infrastructure, such as the IBM® SmartCloud® Orchestrator open cloud management platform, or IBM® Bluemix™, which is an open-standards, cloud-based platform for building, managing, and running apps of all types, such as web, mobile, big data, and smart devices. Bluemix capabilities include Java, mobile back-end development, and application monitoring, as well as features from ecosystem partners and open source—all provided as-a-service in the cloud. Bluemix abstracts and hides most of the complexities that are associated with hosting and managing cloud-based applications. Bluemix is based on Cloud Foundry open technology and runs on SoftLayer infrastructure.

A hybrid cloud is a composition of two or more clouds (private, community or public) that remain distinct entities but are bound together, offering the benefits of multiple deployment models. As private enterprises use the public cloud as a hybrid environment to develop and deploy new cloud-based applications (e.g., using Bluemix), access to the customer's on-premises resources (applications and data) from the public cloud application sometimes is required. In particular, application developers in this environment often desire to develop application source code that accesses these on-premises resources using certain application interfaces, many of which are addressable through non-HTTP-based interfaces. Because these non-HTTP interfaces are native, however, access to numerous transport ports on-premises may be required. Accordingly, enabling access to the on-premises resources typically requires the cloud application developer to interact with an enterprise firewall administrator to obtain permission to open the firewall to new services and ports. Such permission may take time to obtain, thereby impairing the development cycle. This requirement is not an issue with respect to HTTP-based traffic (destined to on-premises applications and servers) because, typically, HTTP-addressable resources are accessed through a security gateway or proxy using URLs over the same TCP port (e.g., port 443), where the URL allows requests to be routed to the correct server and application. In the HTTP case, the local firewall administrator only needs to allow inbound traffic to the IP address and several well-known ports.

There remains a need to provide a way for public cloud applications that use native (non-HTTP-based) protocols to access on-premises applications and data in a secure and seamless manner, and without requiring additional IP addresses and ports to be defined at an on-premises firewall.

BRIEF SUMMARY

According to this disclosure, an application deployed in a public cloud and running over a non-HTTP-based protocol is enabled to access an on-premises resource securely and without requiring additional ports on an enterprise firewall to be opened beyond the standard HTTP ports (i.e. ports 80 and 443). To this end, a pair of security gateways is instantiated, one at the public cloud, and another located on-premises. The security gateway in the public cloud is adapted to be coupled to the deployed cloud application, while the on-premises security gateway is adapted to be coupled to the on-premises resource (e.g., an on-premises application, a database, or the like). Each gateway either maintains (or can otherwise obtain access to) a copy of a policy data set. The policy data set includes one or more data pairs, with a particular data pair being a "condition," and an association "action." The condition identifies a service name, and the action identifies a location (e.g., URI, or the like) of an on-premises resource, together with a security requirement needed to establish a secure connection to that on-premises resource. Thus, a particular policy data set provides the information that is necessary to locate and establish a secure connection to the on-premises resource identified thereby.

In response to a determination that the public cloud application needs to access a particular on-premises resource, the information in the policy data set is used to facilitate setup of the connection. Based on that information, a communication request is issued from the cloud gateway to the on-premises gateway over a socket-based communication channel established between the gateways. Preferably, the communication request is sent over an HTTP-based protocol, in the form of an HTTP WebSocket Upgrade request (on port 443, or any other assigned HTTPS port) such that the application is able to access the on-premises resource without requiring an additional IP address/port to be defined at an on-premises firewall associated with the on-premises gateway. At this point, proxied connectivity is enabled from the public cloud application to the on-premises resource. Thereafter, application data flows in-bound and over the native, non-HTTP-based protocol from the application to the on-premises resource.

The foregoing has outlined some of the more pertinent features of the disclosed subject matter. These features should be construed to be merely illustrative. Many other beneficial results can be attained by applying the disclosed subject matter in a different manner or by modifying the disclosed subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
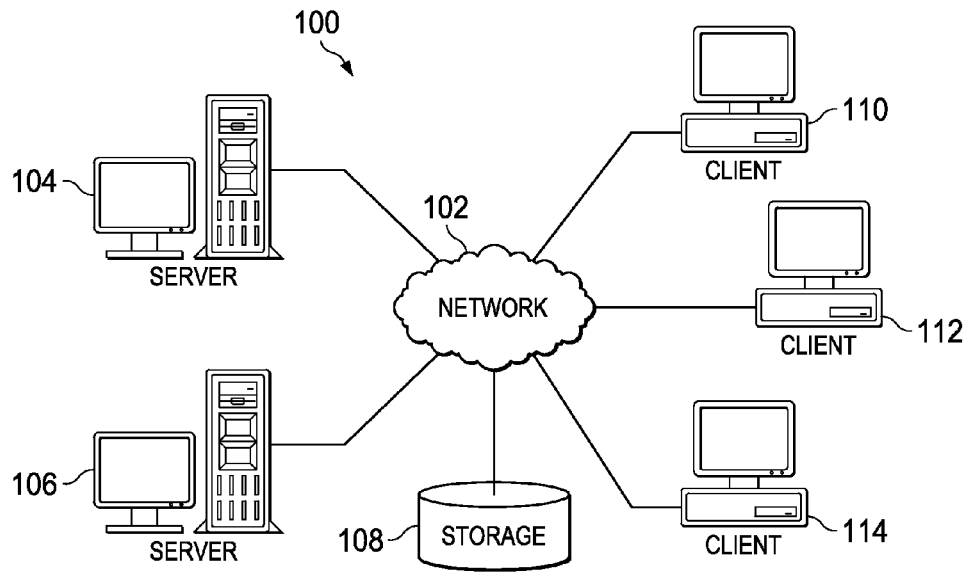
FIG. 1 depicts an exemplary block diagram of a distributed data processing environment in which exemplary aspects of the illustrative embodiments may be implemented.
Figure 2:
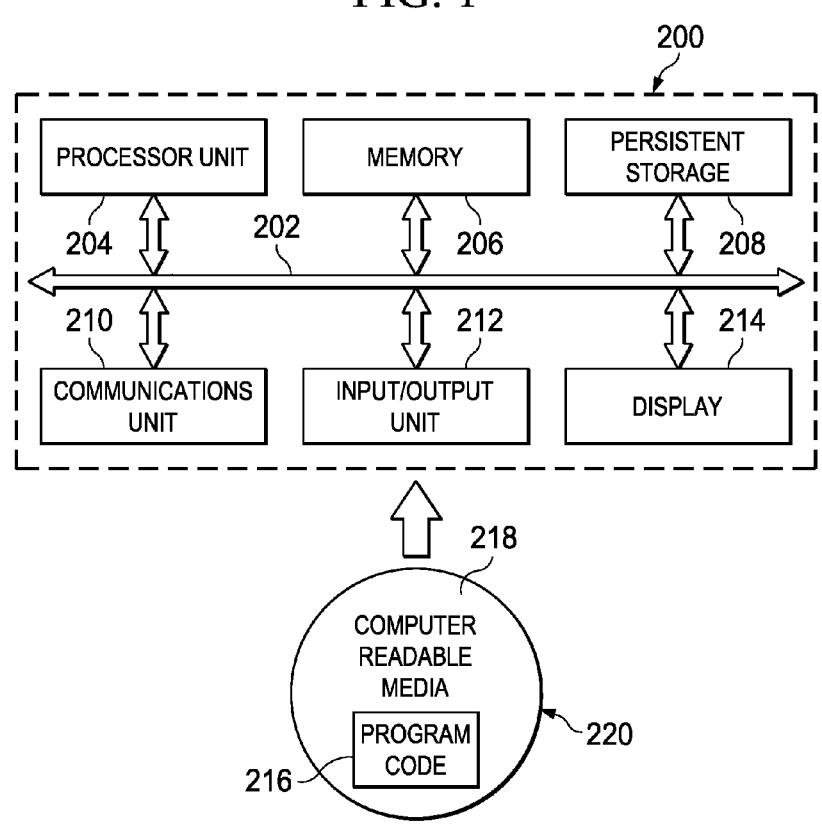
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices.

For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background to this disclosure, a known Internet-standard protocol is WebSocket. The WebSocket protocol was standardized in 2011 by the IETF as Internet Request for Comment (RFC) 6455. WebSocket provides full-duplex communications channels over a single TCP connection. It is typically implemented in web browsers and web servers, which are the endpoints for the communication. The protocol provides a standardized way for the web server to send content to the web browser without being solicited by the client, and allowing for messages to be passed back and forth while keeping the connection open. In this way, a two-way (bi-directional) ongoing conversation can take place between a browser and the server. To establish a WebSocket connection, the client sends a WebSocket handshake request, for which the server returns a WebSocket handshake response. A WebSocket connection may be secure, e.g., using TLS transport. The handshake is compatible with HTTP but is independent of both TCP and HTTP. The WebSocket Protocol thus enables two-way communication, e.g., between a client running untrusted code in a controlled environment, to a remote host that has opted-in to communications from that code.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
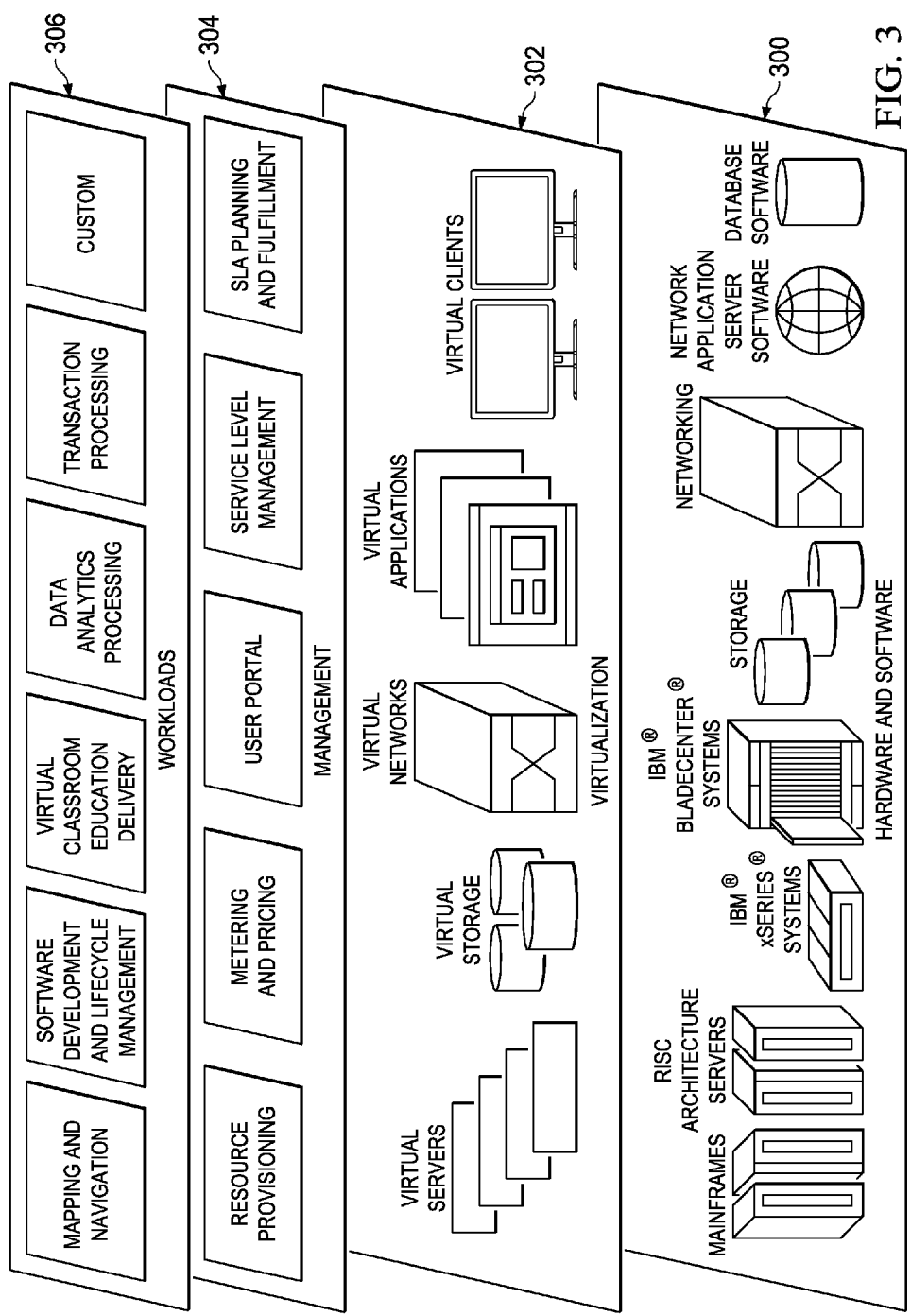
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

In a non-limiting implementation, representative platform technologies are, without limitation, IBM System X® servers with VMware vSphere 4.1 Update 1 and 5.0.

Cloud Deployment Technologies

It is known to provide an appliance-based solution to facilitate rapid adoption and deployment of both Infrastructure and Platform as Service offerings. One such appliance is IBM Workload Deployer (IWD), and this appliance also may be used to manage a shared, multi-tenant environment, where isolation and security are important. The secure nature of the physical appliance typically is provided by a self-disabling switch, which is triggered if the appliance cover is removed. This physical security enables the appliance to serve as a secure vault for credentials, which can be tied to virtual images throughout their entire lifecycle (in storage, being dispensed, running in the cloud, or being removed from the cloud). IBM Workload Deployer also contains a storage driver that streamlines the storage of image customizations. It also serves as a dedicated store for both pre-loaded and customized middleware virtual images and patterns.

In operation, the appliance can provision standard and customized middleware virtual images and patterns that can be securely deployed and managed within private or on-premises cloud computing environments. These virtual images can help organizations to develop, test, and deploy business applications easily and quickly. Upon completion, resources are returned to the shared resource pool automatically for future use and are logged for internal charge-back purposes. The appliance also manages individual user and group access to resources, providing IT managers with the control needed to optimize efficiency at a fine-grain level.

Figure 4:
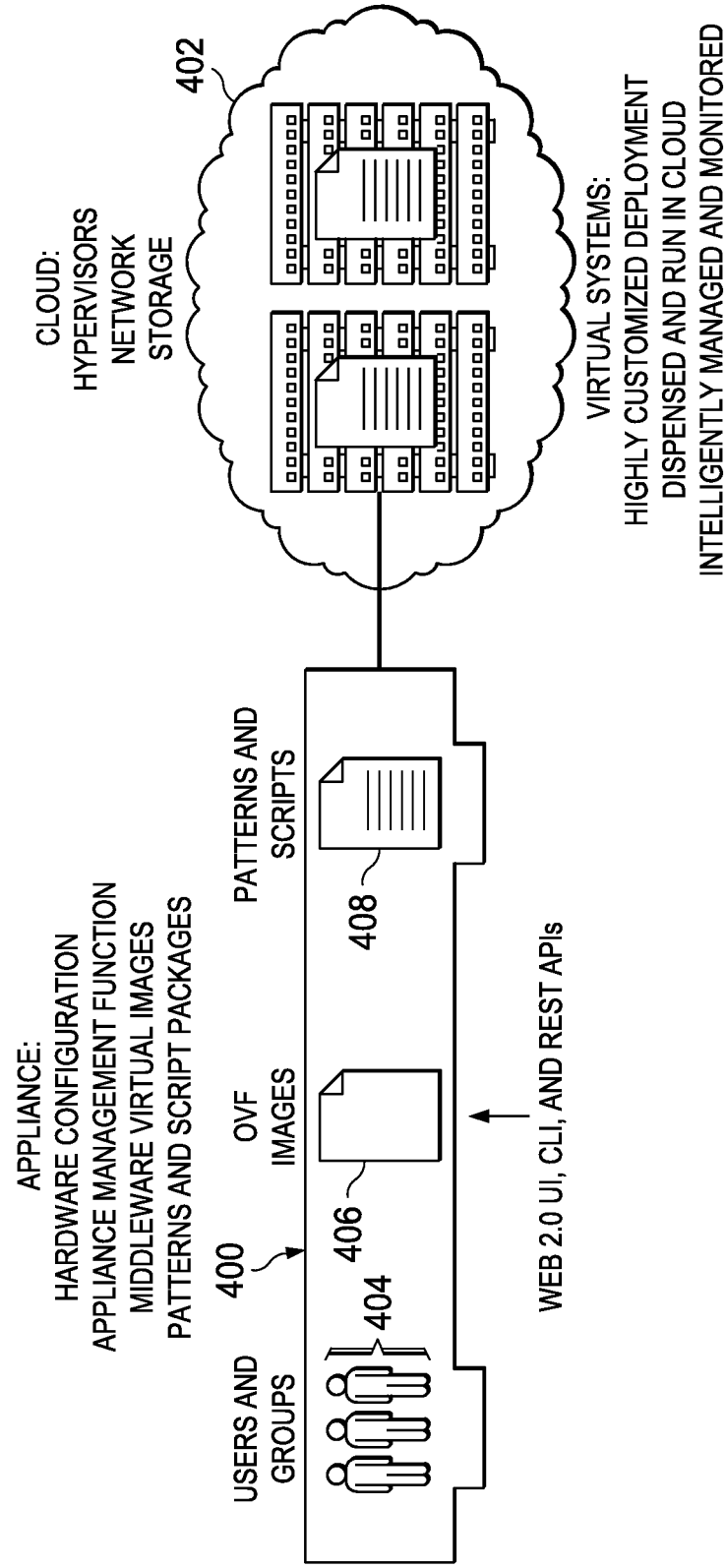
FIG. 4 illustrates an exemplary operating environment in which a network-based appliance may be used to facilitate deployment of one or more cloud-based offerings.

Referring to FIG. 4, a representative operating environment includes the physical appliance 400, which interfaces to the cloud 402. The appliance may be implemented using a data processing system such as described above with respect to FIG. 2. Preferably, the appliance 400 includes a Web 2.0-based user interface (UI), a command line interface (CLI), and REST-based application programming interfaces (APIs). The appliance provides a management function that enables the rapid deployment of cloud-based solutions. To that end, the appliance provides storage for (i) data 404 used to manage user and group access to resources, (ii) for pre-loaded and/or customizable middleware virtual images 406, and (iii) for configurable patterns and script packages 408. Patterns are logical descriptions of both the physical and virtual assets that comprise a particular solution. The management function and interfaces provide a template-based approach to construction that permits the rapid creation and modification of an otherwise complex set of hardware and software components.

As also seen in FIG. 4, the on-premises or private cloud environment 402 on which the middleware application runs typically constitutes hypervisors, networking infrastructure, and storage devices that are allocated to the appliance. A representative environment may be implemented in the manner described above with respect to FIG. 3.

As further background, IBM® Bluemix™ is an open-standards, cloud-based platform for building, managing, and running apps of all types, such as web, mobile, big data, and smart devices. Capabilities include Java, mobile back-end development, and application monitoring, as well as features from ecosystem partners and open source—all provided as-a-service in the cloud. Bluemix abstracts and hides most of the complexities that are associated with hosting and managing cloud-based applications. Using Bluemix, an application developer can focus on developing the cloud application without having to manage the infrastructure that is required to host it. For mobile apps, the developer can use pre-built services that are provided by Bluemix. For web apps, the developer can upload the application to Bluemix and indicate how many instances to run. Then, Bluemix takes care of the deployment. After the apps are deployed, a user can easily scale them up or down when the usage or load of the apps change.

Bluemix can be used for rapid application development and deployment in the most popular programming languages. For example, mobile apps can be developed and deployed in iOS, Android, and HTML with JavaScript. Web apps can be developed and deployed using languages such as Ruby, PHP, and Java™. In addition, Bluemix also provides middleware services for applications to use. In particular, Bluemix acts on the application's behalf when it provisions new service instances, and then binds those services to the application. This enables the app to perform its real job, leaving the management of the services to the infrastructure.

Figure 5:
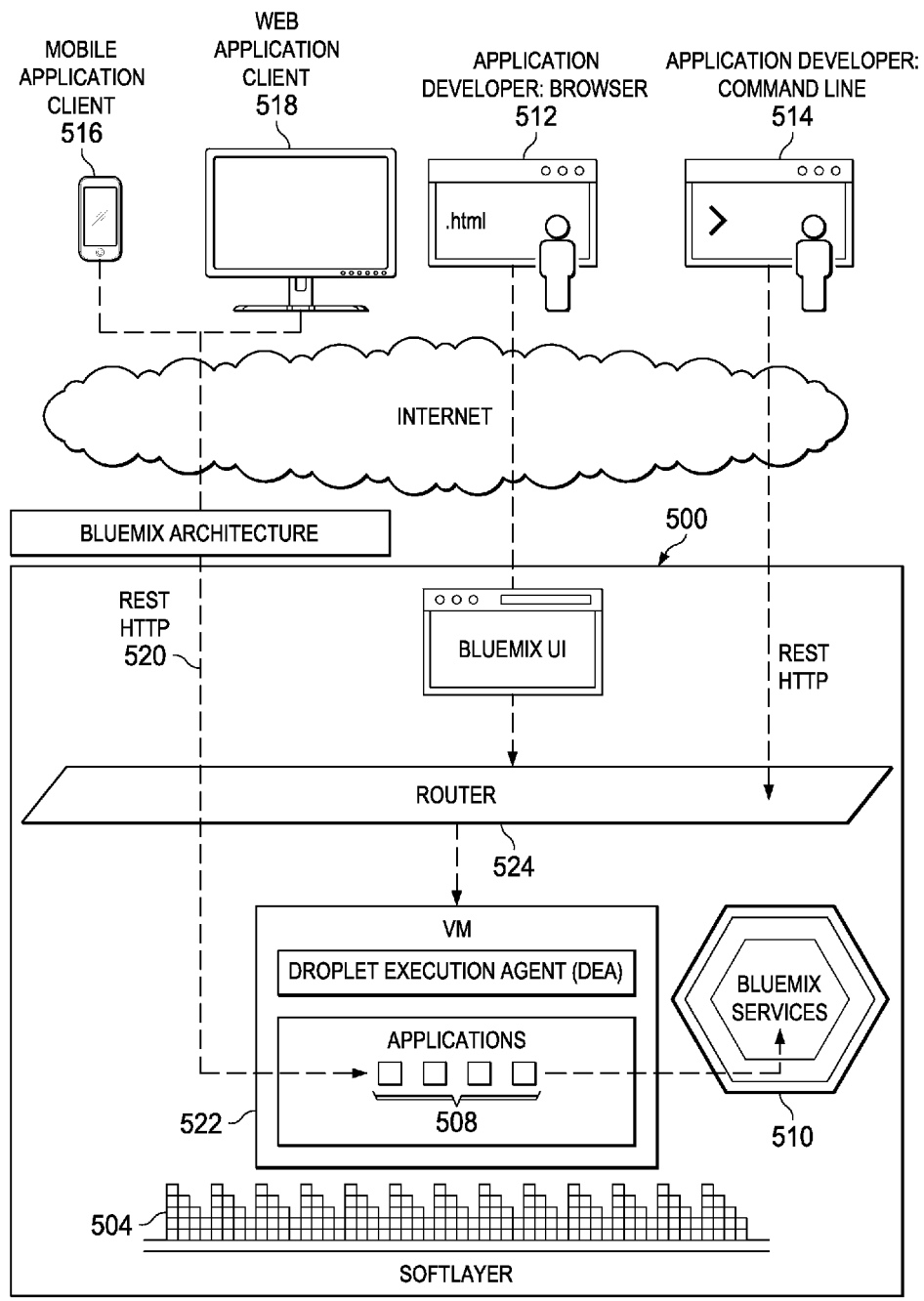
FIG. 5 illustrative representative platform-as-a-service (PaaS) infrastructure, such as IBM® Bluemix™ that may support a deployed cloud application according to this disclosure.

With reference to FIG. 5, Bluemix is an environment 500 for building cloud applications and using services when developing applications. Bluemix also provides an environment to host application artifacts that run on an application server such as Liberty. By using SoftLayer 504, and as will be described below, Bluemix deploys virtual containers that host each deployed application 508. In this environment, the application can use pre-built services (including third-party services) 510 to make application assembly easy. The developer can interact with the Bluemix infrastructure by using a browser-based user interface 512, or a Cloud Foundry command line interface 514, called cf, to deploy web applications. Clients, which can be mobile apps 516, applications that run externally, applications that are built on Bluemix, or application developers that are using browsers 518, interact with the Bluemix-hosted applications. Preferably, clients use REST or HTTP APIs 520 to route requests through Bluemix router 524 to one of the application instances or the composite services.

In Bluemix, cloud applications typically are deployed to different Bluemix regions, wherein a region typically is a defined geographic territory. A developer can choose to deploy either to one region or across multiple regions. When a user deploys an application to Bluemix, he or she must configure Bluemix with enough information to support the application. For a mobile app, Bluemix contains an artifact that represents the mobile applications back end, such as the services that are used by the mobile app to communicate with a server. For a web app, the developer must ensure that information about the proper runtime and framework is communicated to Bluemix so that it can set up the proper execution environment to run the application. Each execution environment, including both mobile and web, is isolated from the execution environment of other applications. The execution environments are isolated even though these apps may be on the same physical machine.

Referring back to FIG. 5, when the user creates an application and deploys it to Bluemix, the Bluemix environment determines an appropriate virtual machine (VM) 522 to which the application or artifacts that the application represents is sent. For a mobile application, a mobile back-end projection is created on Bluemix. Any code for the mobile app running in the cloud eventually runs in the Bluemix environment. For a web app, the code running in the cloud is the application itself that the developer deploys to Bluemix. The determination of the VM is based on several factors, including: the load already on the machine, and runtimes or frameworks supported by that VM. After a VM is chosen, an application manager on each VM installs the proper framework and runtime for the application. Then the application can be deployed into that framework. When the deployment is completed, the application artifacts are started. As shown in FIG. 5, the VM 522, also known as droplet execution agent (DEA), has multiple applications 508 deployed to it. In each VM, an application manager communicates with the rest of the Bluemix infrastructure, and manages the applications that are deployed to this VM. Each VM has containers to separate and protect applications. In each container, Bluemix installs the appropriate framework and runtime that are required for each application. When the application is deployed, if it has a web interface (such as a Java web application), or other REST-based services (such as mobile services exposed publicly to the mobile application), users of the application can communicate with it by using normal HTTP requests. Each application can have one or more URLs associated with it, but all of them must point to the Bluemix endpoint. When a request comes in, Bluemix examines the request, determines which application it is intended for, and then selects one of the instances of the application to receive the request.

A service 510 is a cloud extension that is hosted by Bluemix. The service provides functionality that is ready-for-use by the app's running code. The predefined services provided by Bluemix include database, messaging, push notifications for mobile apps, and elastic caching for web apps. A developer may also create services in Bluemix; these may include simple utilities (e.g., functions of a runtime library), or complex business logic of a process modeling service or a database. Bluemix simplifies the use of services by provisioning new instances of the service, and binding those service instances to an application. The management of the service is handled automatically by Bluemix.

A runtime is the set of resources that is used to run an application. Bluemix provides runtime environments as containers for different types of applications. The runtime environments are integrated as buildpacks into Bluemix, and are automatically configured for use. A buildpack is a collection of scripts that prepare the deployed code for execution on the target PaaS. A buildpack gathers the runtime and framework dependencies of an application. Then, it packages them with the application into a droplet that can be deployed to the cloud.

Of course, any such above-described cloud management environment is not intended to be limiting, as the techniques herein may be implemented in other (open, closed, or hybrid) environments, and/or using other deployment technologies (whether open or proprietary, or mixed).

Enabling On-Premises Services to be Securely Exposed to Public Cloud Applications With the above as background, the techniques of this disclosure are now described.

Figure 6:
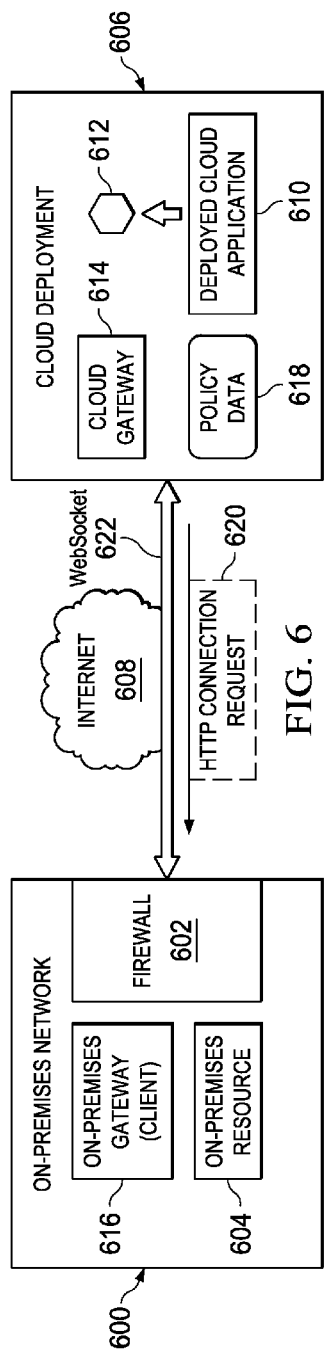
FIG. 6 illustrates how a public cloud application accesses an on-premises resource according to an embodiment of this disclosure.

FIG. 6 depicts the basic operating scenario. Typically, this scenario is a hybrid cloud scenario wherein a cloud application has been deployed in a public cloud, e.g., using Bluemix, while the enterprise deploying the application maintains its own (typically private and secure) enterprise network. Thus, and as depicted in FIG. 6, the enterprise-side comprises enterprise network 600, which includes a firewall 602 or other similar mechanism (e.g., NAT, or the like). An on-premises resource 604 (or, more generally, a "service") comprises an on-premises application, database, or the like. The public cloud-side comprises public cloud 606, such as Bluemix. Public cloud 606 is accessible via an intermediary 608, such as the publicly-routable (IP-based) Internet, or some other network-based link (or links). One or more cloud applications 610 are deployed in the public cloud 606, e.g., using one of the cloud deployment technologies described above. According to this disclosure, it is assumed that cloud application 610 accesses on-premises resource 604 in the normal course via a non-HTTP-based protocol 612. Thus, for example, if the deployed cloud application 610 is a database system and the on-premises resource 604 is a database, the non-HTTP-based protocol 612 might be JDBC. The non-HTTP-based protocol 612 is sometimes referred to herein as a "native" protocol. More generally, a "native" protocol as used herein refers to a non-HTTP (or -HTTPS) protocol (i.e., a protocol that does not use well-known HTTP-based ports (80 and 443).

With this operating scenario, and according to this disclosure, an application 610 deployed in the public cloud 606 and running over a non-HTTP-based protocol 612 is enabled to access the on-premises resource 604 securely and without requiring additional ports on the enterprise firewall 602 to be opened beyond the standard HTTP ports (i.e. ports 80 and 443). To this end, a pair of security gateways is instantiated, one (cloud gateway 614) at the public cloud, and another (on-premises gateway 616) located on-premises. As depicted in FIG. 6, the security gateway 614 in the public cloud is adapted to be coupled to the deployed cloud application 610, while the on-premises security gateway 616 is adapted to be coupled to the on-premises resource 604 (e.g., the on-premises application, a database, or the like). Each gateway either maintains (or can otherwise obtain access to) a policy data set 618. The policy data set includes one or more data pairs, with a particular data pair being a "condition," and an association "action." The condition identifies a service name, and the action identifies a location (e.g., URI, or the like) of an on-premises resource 604, together with a security requirement needed to establish a secure connection to that on-premises resource. Thus, a particular policy data set provides the information that is necessary to enable the gateways 614 and 616 to locate and establish a secure connection to the on-premises resource identified thereby.

The basic operation of the technique of this disclosure is now described. In response to a determination (e.g., receipt of a connection request) that the public cloud application 610 needs to access the particular on-premises resource 604, the information in the policy data set 618 is used to facilitate the connection setup. In particular, and based on that information, a communication request 620 is issued from the cloud gateway to the on-premises gateway over a socket-based communication channel 622 established between the gateways. Desirably, the communication request 620 is sent over an HTTP-based protocol, preferably in the form of an HTTP WebSocket Upgrade request on port 443, such that the application 610 is able to access the on-premises resource 602 without requiring an additional IP address/port to be defined at an on-premises firewall 602 associated with the on-premises gateway 616.

The use of HTTP WebSocket provides significant advantage in this context. In particular, and unlike a conventional HTTP WebSocket request, which would be delivered to an endpoint specified in the request, the initial communication request is used only to carry (i.e. transport) the target application information (namely, its location and security requirement) between the gateways 614 and 616; thus, preferably the initial HTTP-based connection request is terminated at the on-premises security gateway 616. Further, once the security gateway 616 identifies the location and security requirement for the on-premises resource, an end-to-end communication path may then be created. In particular, proxied connectivity is enabled from the public cloud application 610 to the cloud gateway 614, from the cloud gateway 614 to the on-premises gateway 616, and then from the on-premises gateway 616 to the on-premises resource 602. There may be additional connections (or paths) within each such proxied connection. Preferably, the deployed cloud application 610 communicates with its associated gateway 616 over the native, non-HTTP-based protocol that the application uses to interact with the on-premises resource. Communications between the gateways proceed over the WebSocket communication channel that is established therebetween; in this context, however, the WebSocket is not used as designed (in the standard protocol) but rather is used just to proxy the raw TCP traffic (from gateway-to-gateway). Once the traffic crosses over the gateway-to-gateway connection (e.g., over the public Internet), it then needs to be delivered to the on-premises gateway. At this point, typically the native, non-HTTP-based protocol is used for the interaction between the on-premises gateway 616 and its associated endpoint, namely, the on-premises resource 602. Thus, application data flows in-bound and over the native, non-HTTP-based protocol from the application to the on-premises resource. Of course, out-bound data flows initiated from the on-premises resource 602 and intended for the cloud application can be delivered in a similar manner.

The WebSocket protocol was designed originally as a framing protocol to facilitate real-time traffic flows for long poll traffic. According to this disclosure, and as has been described, the protocol is re-purposed to enable the gateways to communicate the initial connection request without requiring special ports to be opened on the firewall, as well as to proxy the raw TCP traffic (the non-HTTP-based protocol data). The WebSocket connection acts as a tunnel from the on-premises gateway, to the cloud gateway (e.g., Bluemix). There can be more than one tunnel from different on-premises gateways to the same cloud gateway configuration. When there is more than one (1) on-premises gateway associated to the cloud gateway configuration, load balancing rules (e.g., round robin, first-alive, least-connected, etc.) may be used to determine which tunnel and therefore which on-premises gateway is targeted to receive the HTTP/TCP connection request (for the in-bound case). There may be many such connection requests to a destination as determined by a particular policy data set.

In one embodiment, the policy data set described above is replicated at each gateway. This is not a requirement, however. In an alternative embodiment, the on-premises gateway may be "stateless," in which case the policy data set may be encoded within a token (e.g., a JSON Web Token (JWT)) and bound to the communication channel "on-the-fly" or "as-needed" when the HTTP connection request is delivered. This can provide a "just-in-time" or "late-binding" of policy. In this alternative embodiment, the on-premises gateway may be generalized as a "client" that has the capability of interacting with the cloud gateway in this stateless manner. Representative clients may comprise client software (and a software installer) that has the ability to establish and manage Bluemix connectivity, a Docker image that includes "run anywhere" functionality, IBM DataPower appliance with security enforcements, or the like. When the client is stateless, the software provides for the ability to generate the JWT for each gateway instance to which the client may connect. In particular, the JWT allows the stateless client to connect and authenticate with the cloud gateway to acquire configuration (e.g., the policy data set), live client software upgrades, and other information. The JWT may also contain region-specific connection information. Typically, in this embodiment the cloud gateway is uniquely identified using the token, and this gateway holds the destination configuration (i.e. policy data sets, with their associated security policies) in its entirety.

Figure 7:
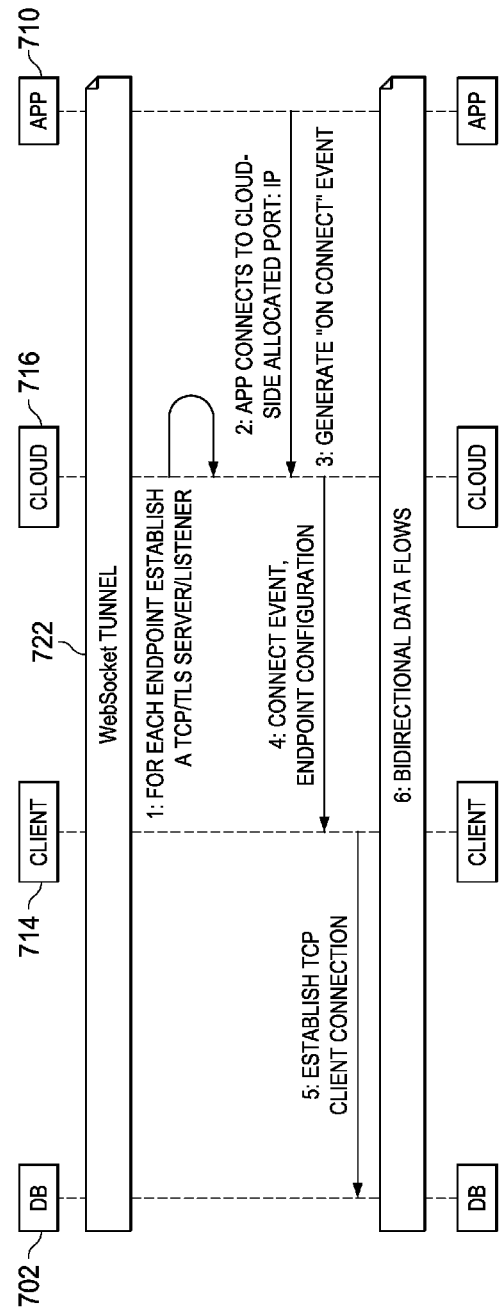
FIG. 7 depicts a connection setup according to this disclosure.

FIG. 7 depicts a flow diagram of the connection set-up and use of the WebSocket in additional detail. In this example scenario, the cloud application 710 is a database application that desires to communicate in-bound to the database (the on-premises resource) 702. The cloud gateway 716 communicates over the Internet with the client 714, which, as noted above, represents the on-premises gateway previously described. On the cloud side there may be one or more instances of a management application (not shown) all connected to the cloud application 710. Typically, there is one cloud gateway 716 per region (in Bluemix). At step (1), the cloud gateway sets up a server listener thread to listen for access requests (to the database) initiated from the application. At step (2), the cloud application tries to establish a connection to the database. At step (3), the cloud gateway generates an "on connect" event, which provides sufficient information (e.g., the service name) to enable lookup of the endpoint state (location, and security requirement). At step (4), the gateway echoes the "on connect event" across the WebSocket tunnel 722, which preferably has been previously established between the client and the gateway. The tunnel may be established "as needed" in response to receipt by the gateway of the connection request (from the cloud application), although typically it will be set up in advance. At step (5), the client receives the endpoint information in the HTTP connection request and establishes a new connection to the database (the endpoint). At step (6), the database responds, and bi-directional data flows (between the application and the database) are enabled to complete the process.

As depicted in FIG. 7, preferably TCP is terminated at the cloud gateway and then re-established at the client.

As FIG. 7 illustrates, the public cloud virtual security gateway is listening on a unique local IP address/TCP port pair combination, which combination represents a specific target application or database configured in the list of eligible targets. Note that a public cloud security gateway instance can be listening on multiples of these unique local IP address/TCP port pair combinations (one per on-premises application or database). The public cloud virtual gateway, using the local IP address/TCP port pair combination as input, locates a policy rule condition with policy rule action which resolves to a "service name" or URI for the target on-premises application or database.

Before any application data flows between the public cloud security gateway and on-premises security gateway, the public cloud security gateway using the WebSockets protocol executes the policy rule action, preferably by sending a WebSockets "Upgrade" request that contains the service name or URI that corresponds to the on-premises target application in the list of eligible targets. Because WebSockets protocol is based on HTTPS, the on-premises security gateway can process the WebSockets "Upgrade" request on port 443 along with other non-related HTTPS traffic. When the upgrade request is received, the on-premises security gateway locates the desired on-premises target application from the eligible targets list and proxies the connection to the named application with specified security session requirements. As previously described, the WebSockets "Upgrade" request itself preferably is not forwarded to the target application because it is used only between the public cloud and on-premises security gateway as a method to carry target application information. At this point, proxied connectivity has been enabled from the public cloud application to the target application, and native application flows are sent over these proxied connections. Because these are not HTTPS requests, however, preferably the on-premises gateway bypasses its HTTP logic for this established connection.

Using the method described above, a public cloud application using native application (non-HTTP) protocols is able to access on-premises applications and data without requiring additional IP addresses and ports to be defined at the on-premises firewall.

There may be multiple cloud gateways provisioned as a gateway service. In one embodiment, there may be multiple cloud gateways per region (for a Bluemix-based configuration).

The above-described technique typically is operative for in-bound flows over a previously-established WebSocket (tunnel) from the on-premises client-side gateway, and the cloud gateway. In an alternative, region-aware client tunnel establishment may be implemented, by which a client establishes the tunnel to the gateway. In this alternative, the client is stateless and the JWT contains an array of region-specific URLs to where an initial HTTPS GET request should go to learn which gateway node to which to connect. In Bluemix, for example, the URLs embedded in the JWT point to a subset of the gateway nodes for the region. In this example, the initial HTTP GET request allows the cloud infrastructure to determine which node will provide the best service to provide effective WebSocket tunnel load balancing. The client attempts to connect to each URL until a successful connection is established. Because the JWT points to a subset of the available nodes, the first request typically is to determine the actual gateway node to which the WebSocket connection should be established.

Once the WebSocket connection tunnel is established, data flows may go in either direction.

The policy data set may be augmented to include additional information, such as connection limiting data, authentication and access control information, and the like, in which case the policy rule match (at the gateway) may take such information into consideration before issuing the HTTP connection request across the WebSocket. Alternatively, such additional information may be passed along with the connection request and enforced on-premises.

The technique of this disclosure provides numerous advantages. It provides a method to securely allow inbound non-HTTP traffic from a public cloud to access on-premises resources without requiring additional ports on the firewall to be opened beyond the standard http ports 80 and 443 (or any other assigned HTTP or HTTPS port). The approach is enabled by the virtual security gateway that is instantiated in the public cloud and that works in tandem with a security gateway on-premises at the enterprise site. Between the public cloud security gateway and the on-premises security gateway, the WebSockets protocol is leveraged to flow information via a new WebSocket sub-protocol registration that enables traffic originating from the public cloud application to be routed to the correct on-premises application. Using this approach, an application written in the public cloud accesses an on-premises application or data in a seamless and secure manner using its native connection protocol. Connectivity from this application is made with a series of proxied connections secured via standard means such as Transport Level Security (TLS). As has been described, the nodes which are involved in this proxied communication are: (1) the public cloud application, which connects to (2) a virtual security gateway in the public cloud, which connects to (3) an on-premises security gateway, which connects to (4) the target on-premises application or database. The on-premises security gateway has only the well-known port 443 open using one or more local IP addresses. On the on-premises gateway, a list of eligible target applications or databases are configured with location information (hostname or IP address, TCP port) and security information (e.g TLS ciphersuites, credentials) needed to make a secure connection to on-premises application/database.

Without limitation, the subject matter may be implemented within or in association with a cloud deployment platform system or appliance (FIG. 4 or FIG. 5) as has been described, or using any other type of deployment systems, products, devices, programs or processes. A representative cloud application platform with which the security assurance service may be implemented includes, without limitation, IBM® Bluemix. The reference to this commercial system is not intended to be limited, as the security assurance service of this disclosure may interoperate with any cloud infrastructure.

The techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

The secure gateway service of this disclosure as described above may be implemented by a cloud service provider that operates infrastructure for a private cloud, a public cloud, or a hybrid cloud. This security gateway service deploys and manages security infrastructure in a known manner to support the functionality.

As described, the approach herein may be implemented manually or in an automated manner, in whole or in part.

While a preferred operating environment and use case (a cloud deployment appliance or platform environment) has been described, the techniques herein may be used in any other operating environment in which it is desired to deploy applications or other services while enforcing the described security constraints.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment as described above, the functionality provided herein is implemented as an adjunct or extension to an existing cloud compute deployment management solution.

Although the described embodiment refers to the cloud gateway as positioned in a public cloud, and while this will be a common use case, the techniques may be practiced with the particular gateway deployed in other types of infrastructure, such as a private cloud, a community cloud, or an origin. Thus, the notion of a "cloud gateway" should be construed to cover any of these arrangements.

Further, while the typical use case (the cloud application pulling data from the on-premises resource) has been described above, it should be appreciated that there may be circumstances where the approach is implemented in the opposite direction (e.g., an on-premises resource pulling data from the cloud application). The dual gateway, socket-based communication channel technique of this disclosure may be used in such a scenario. More generally, this architecture and the described approach may be implemented irrespective of the application flow direction.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to a technology or technical field, namely, computing entities that manage cloud deployments, as well as improvements to the functioning of the application deployment mechanism itself, namely, by extending its conventional functionality as has been described.

Having described our invention, what we now claim is as follows:

1. Apparatus, comprising:
   a processor;
   computer memory holding computer program instructions executed by the processor to enable an application deployed in a public cloud to access an on-premises resource, the application having been deployed in the public cloud from an enterprise that retains the on-premises resource, wherein the application normally accesses the on-premises resource over a native, non-HTTP-based protocol, the computer program instructions comprising:
   program code to provide a policy data set having at least one condition, and an associated action, wherein the condition identifies a service name, and the action identifies a location in the enterprise of the on-premises resource, together with a security requirement needed to establish a secure connection to the on-premises resource;
   program code responsive to a determination that the application needs to access the on-premises resource, to issue a connection request from a cloud gateway associated with the application to an on-premises gateway, the connection request being issued over a socket-based communication channel established between the cloud gateway and the on-premises gateway to carry the policy data set to the on-premises gateway, the connection request provided over an HTTP-based protocol, the on-premises gateway using the policy data set to locate the on-premises resource and to establish a proxy connection thereto according to the security requirement, the connection request being terminated at the on-premises gateway, and the proxy connection including a new TCP connection between the on-premises gateway and the on-premises resource; and
   program code responsive to locating the on-premises resource and establishment of the proxy connection to deliver application data over the native, non-HTTP-based protocol from the application to the on-premises resource;
   wherein the application data is communicated over a native, non-HTTP-based protocol from the application to the cloud gateway over the proxied connection, then from the cloud gateway to the on-premises gateway over the socket-based communication channel, and then from the on-premises gateway to the on-premises resource.

2. The apparatus as described in claim 1 wherein the connection request is an HTTP WebSocket Upgrade request on port 443.

3. The apparatus as described in claim 2 wherein the computer program instructions further include program code to establish a proxied connection from the application to the cloud gateway.

4. The apparatus as described in claim 1 wherein the computer program instructions further include program code operative to associate a second on-premises gateway to the cloud gateway, wherein the socket-based communication channel is used for a communication between the cloud gateway and the second on-premises gateway.

5. The apparatus as described in claim 1 wherein the computer program instructions further include program code to establish the socket-based communication channel in advance of the determination, or in response to the determination.

6. A computer program product in a non-transitory computer readable medium for use in a data processing system, the computer program product holding computer program instructions executed by the data processing system to enable an application deployed in a public cloud to access an on-premises resource, the application having been deployed in the public cloud from an enterprise that retains the on-premises resource, wherein the application normally accesses the on-premises resource over a native, non-HTTP-based protocol, the computer program instructions comprising:

program code to provide a policy data set having at least one condition, and an associated action, wherein the condition identifies a service name, and the action identifies a location in the enterprise of the on-premises resource, together with a security requirement needed to establish a secure connection to the on-premises resource;

program code responsive to a determination that the application needs to access the on-premises resource, to issue a connection request from a cloud gateway associated with the application to an on-premises gateway, the connection request issued over a socket-based communication channel established between the cloud gateway and the on-premises gateway to carry the policy data set to the on-premises gateway, the connection request provided over an HTTP-based protocol, the on-premises gateway using the policy data set to locate the on-premises resource and to establish a proxy connection thereto according to the security requirement, the connection request being terminated at the on-premises gateway, and the proxy connection including a new TCP connection between the on-premises gateway and the on-premises resource; and program code responsive to locating the on-premises resource and establishment of the proxy connection to deliver application data over the native, non-HTTP-based protocol from the application to the on-premises resource; wherein the application data is communicated over a native, non-HTTP-based protocol from the application to the cloud gateway over the proxied connection, then from the cloud gateway to the on-premises gateway over the socket-based communication channel, and then from the on-premises gateway to the on-premises resource.

7. The computer program product as described in claim 6 wherein the connection request is an HTTP WebSocket Upgrade request on port 443.

8. The computer program product as described in claim 7 wherein the computer program instructions further include program code to establish a proxied connection from the application to the cloud gateway.

9. The computer program product as described in claim 6 wherein the computer program instructions further include program code operative to associate a second on-premises gateway to the cloud gateway, wherein the socket-based communication channel is used for a communication between the cloud gateway and the second on-premises gateway.

10. The computer program product as described in claim 6 wherein the computer program instructions further include program code to establish the socket-based communication channel in advance of the determination, or in response to the determination.

* * * * *